United States Patent
Wu et al.

(10) Patent No.: US 12,345,947 B2
(45) Date of Patent: Jul. 1, 2025

(54) OPTICAL ELEMENT DRIVING MECHANISM

(71) Applicant: TDK TAIWAN CORP., Taoyuan (TW)

(72) Inventors: Ya-Hsiu Wu, Taoyuan (TW); Yi-Ho Chen, Taoyuan (TW); Ying-Jen Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 729 days.

(21) Appl. No.: 17/675,373

(22) Filed: Feb. 18, 2022

(65) Prior Publication Data
US 2022/0269034 A1    Aug. 25, 2022

Related U.S. Application Data

(60) Provisional application No. 63/151,204, filed on Feb. 19, 2021.

(51) Int. Cl.
| | |
|---|---|
| *G02B 7/09* | (2021.01) |
| *G02B 7/04* | (2021.01) |
| *G02B 26/08* | (2006.01) |
| *G02B 27/64* | (2006.01) |
| *G03B 5/00* | (2021.01) |
| *H04N 23/54* | (2023.01) |
| *H04N 23/55* | (2023.01) |
| *H04N 23/68* | (2023.01) |

(52) U.S. Cl.
CPC ............... *G02B 7/09* (2013.01); *G02B 7/04* (2013.01); *G02B 26/08* (2013.01); *G02B 27/646* (2013.01); *G03B 5/00* (2013.01); *H04N 23/54* (2023.01); *H04N 23/55* (2023.01); *H04N 23/687* (2023.01); *G03B 2205/0069* (2013.01)

(58) Field of Classification Search
CPC . G02B 7/09; G02B 7/10; G02B 26/08; G02B 27/646; G02B 7/04; H04N 23/687; H04N 23/54; H04N 23/55; G03B 5/00; G03B 2205/0069
USPC ................................... 359/823, 212
See application file for complete search history.

(56) References Cited

U.S. PATENT DOCUMENTS

| | | | |
|---|---|---|---|
| 10,983,303 B2 * | 4/2021 | Jung | H04N 23/57 |
| 2016/0259094 A1 * | 9/2016 | Aschwanden | G02B 27/095 |
| 2018/0246315 A1 * | 8/2018 | Miner | G02B 26/0816 |
| 2019/0278102 A1 * | 9/2019 | Suter | G02B 27/646 |
| 2022/0121036 A1 * | 4/2022 | Kim | G03B 30/00 |

(Continued)

FOREIGN PATENT DOCUMENTS

KR    2018009542 A  *  1/2018  ............ B60W 10/02

*Primary Examiner* — Pinping Sun
*Assistant Examiner* — Andrew R Wright
(74) *Attorney, Agent, or Firm* — Muncy, Geissler, Olds & Lowe, P.C.

(57) ABSTRACT

An optical element driving mechanism is provided, including a movable part, a fixed part, a driving assembly, and a first supporting assembly. The movable part is used for connecting an optical element. The movable part is movable relative to the fixed part. The driving assembly is used for driving the movable part to move relative to the fixed part. The movable part is movable relative to the fixed part through the support of the first supporting assembly. The movable part includes a movable part setting surface, and the movable part setting surface corresponds to the optical element.

20 Claims, 6 Drawing Sheets

(56) References Cited

U.S. PATENT DOCUMENTS

2022/0132084 A1\* 4/2022 Yanagisawa ....... G02B 26/0875
2022/0326510 A1\* 10/2022 Lee .......................... G03B 5/00

\* cited by examiner

OPTICAL ELEMENT DRIVING MECHANISM

CROSS REFERENCE TO RELATED APPLICATIONS

This application claims the benefit of U.S. Provisional Application No. 63/151,204, filed 19 Feb. 2021, the entirety of which is incorporated by reference herein.

BACKGROUND OF THE INVENTION

Field of the Invention

The present disclosure relates to an optical element driving mechanism, and more particularly to the optical element driving mechanism of an electrical device.

Description of the Related Art

As the relevant technologies have been developed, many electronic devices (such as computers and tablets) have been equipped with the capability to record images and videos. However, when an optical element (such as a lens) having a long focal length is provided in an electronic device, the thickness of the electronic device may be increased, impeding the prospects for miniaturization of the electronic device. Therefore, how to design an optical element driving mechanism and an optical device that help to miniaturize the electronic device has become an important issue.

BRIEF SUMMARY OF THE INVENTION

To solve the problems of the prior art, an optical element driving mechanism is provided, including a movable part, a fixed part, a driving assembly, and a first supporting assembly. The movable part is used for connecting an optical element. The movable part is movable relative to the fixed part. The driving assembly is used for driving the movable part to move relative to the fixed part. The movable part is movable relative to the fixed part through the support of the first supporting assembly. The movable part includes a movable part setting surface, and the movable part setting surface corresponds to the optical element.

In one of the embodiments of the present disclosure, the movable part setting surface is parallel to a first axis. The movable part setting surface is perpendicular to a second axis. The movable part setting surface is parallel to a third axis. The first axis is perpendicular to the second axis. The first axis is perpendicular to the third axis. The second axis is perpendicular to the third axis. The optical element driving mechanism with an elongated structure extends along the first axis when viewed along the second axis.

In one of the embodiments of the present disclosure, the driving assembly is used for driving the optical element to move in a first dimension. The driving assembly is used for driving the optical element to move in a second dimension. The first dimension is different from the second dimension. The first dimension is a rotation about a first rotation axis. The first rotation axis is parallel to the first axis. The second dimension is a rotation about a second rotation axis. The second rotation axis is parallel to the third axis.

In one of the embodiments of the present disclosure, the driving assembly include: a first magnetic element; a first coil assembly, corresponding to the first magnetic element; a second magnetic element, corresponding to the first coil assembly; a third magnetic element; a second coil assembly, corresponding to the third magnetic element; and a fourth magnetic element, corresponding to the second coil assembly. The first magnetic element is used to correspond to the movable part frame of the movable part to generate a first driving force. The first driving force is used to move the movable part frame relative to the fixed part in the first dimension. The second magnetic element is used to generate a second driving force to the movable part frame. The second driving force is used to move the movable part frame relative to the fixed part in the first dimension. The direction of the first driving force is parallel to the direction of the second driving force. The magnetic pole alignment direction of the first magnetic element is the same as the magnetic pole alignment direction of the second magnetic element.

In one of the embodiments of the present disclosure, the first magnetic element and the second magnetic element are located at opposite sides of the optical element when viewed along the second axis. The first magnetic element and the second magnetic element are located at opposite sides of the first rotation axis when viewed along the second axis. When viewed along the second axis, the line that connects the center of the first magnetic element and the center of the second magnetic element passes through the optical element. A third driving force on the movable part setting surface of the movable part. The third driving force is used to move the movable part setting surface relative to the movable part frame in the second dimension. The fourth magnetic element is used to generate a fourth driving force to the movable part setting surface. The fourth driving force is used to move the movable part setting surface relative to the movable part frame in the second dimension.

In one of the embodiments of the present disclosure, the direction of the third driving force is parallel to the direction of the fourth driving force. The magnetic pole alignment direction of the third magnetic element is the same as the magnetic pole alignment direction of the fourth magnetic element. The third magnetic element and the fourth magnetic element are located at opposite sides of the optical element when viewed along the second axis. The third magnetic element and the fourth magnetic element are located at opposite sides of the second rotation axis when viewed along the second axis. When viewed along the second axis, the line that connects the center of the third magnetic element and the center of the fourth magnetic element passes through the optical element.

In one of the embodiments of the present disclosure, the direction of the first driving force is parallel to the direction of the third driving force. The magnetic pole alignment direction of the first magnetic element is not parallel to the magnetic pole alignment direction of the third magnetic element. The magnetic pole alignment direction of the first magnetic element is perpendicular to the magnetic pole alignment direction of the third magnetic element. The alignment direction of the center of the first magnetic element and the center of the second magnetic element is not parallel to the alignment direction of the center of the third magnetic element and the center of the fourth magnetic element. The alignment direction of the center of the first magnetic element and the center of the second magnetic element is perpendicular to the alignment direction of the center of the third magnetic element and the center of the fourth magnetic element.

In one of the embodiments of the present disclosure, when viewed along the second axis, the shortest distance between the first magnetic element and the center of the movable part setting surface is different from the shortest distance between the third magnetic element and the center of the movable part setting surface. When viewed along the second axis, the shortest distance between the first magnetic element and the center of the movable part setting surface is greater than the shortest distance between the third magnetic element and the center of the movable part setting surface. When viewed along the second axis, the shortest distance between the first magnetic element and the second magnetic element is different from the shortest distance between the third magnetic element and the fourth magnetic element. When viewed along the second axis, the shortest distance between the first magnetic element and the second magnetic element is greater than the shortest distance between the third magnetic element and the fourth magnetic element.

In one of the embodiments of the present disclosure, when viewed along the magnetic pole alignment direction of the first magnetic element, the first magnetic element partially overlaps the third magnetic element. When viewed along the magnetic pole alignment direction of the third magnetic element, the third magnetic element does not overlap the first magnetic element. The first magnetic element has an elongated structure, and the third magnetic element has an elongated structure when viewed along the second axis. The length of the first magnetic element is greater than the length of the third magnetic element when viewed along the second axis. The width of the first magnetic element is shorter than the width of the third magnetic element when viewed along the second axis.

In one of the embodiments of the present disclosure, the optical element driving mechanism further includes: a first supporting assembly, wherein the movable part frame is movable relative to the fixed part through the first supporting assembly; and a second supporting assembly, wherein the movable part setting surface is movable relative to the movable part frame through the second supporting assembly. The first supporting assembly includes a first supporting element with an elongated structure. The first supporting element is movable relative to the fixed part or the movable part frame. The second supporting assembly is flexible, and the second supporting assembly is partially fixedly connected to the movable part setting surface and the movable part frame.

In one of the embodiments of the present disclosure, the first magnetic element does not overlap the first supporting element when viewed along the first axis. The third magnetic element at least partially overlaps the first supporting element when viewed along the first axis. The first magnetic element at least partially overlaps the first supporting element when viewed along the third axis. The third magnetic element does not overlap the first supporting element when viewed along the third axis.

In one of the embodiments of the present disclosure, the driving assembly further includes a driving assembly substrate, and the first coil assembly is disposed on the driving assembly substrate. The driving assembly substrate has a plate-like structure. The first coil assembly is disposed on the first driving assembly substrate surface of the driving assembly substrate. The second coil assembly is disposed on the driving assembly substrate. The second coil assembly is disposed on a second driving assembly substrate surface of the driving assembly substrate. The first driving assembly substrate surface and the second driving assembly substrate surface face in different directions.

In one of the embodiments of the present disclosure, the first driving assembly substrate surface and the surface of the second driving assembly substrate surface face opposite directions. When viewed along a direction that is perpendicular to the thickness of the driving assembly substrate, the first coil assembly and the second coil assembly are located at opposite sides of the driving assembly substrate. When viewed along the first coil assembly winding axis of the first coil assembly, the first coil assembly and the second coil assembly do not overlap each other. When viewed along the second coil assembly winding axis of the second coil assembly, the second coil assembly at least partially overlaps the optical element.

In one of the embodiments of the present disclosure, the driving assembly substrate further includes: a driving assembly substrate body, having a metal material; a first insulating layer, located between the driving assembly substrate body and the first coil assembly; and a second insulating layer, located between the driving assembly substrate body and the second coil assembly. When viewed along the thickness direction of the driving assembly substrate, the optical element does not overlap the first insulating layer. When viewed along the thickness direction of the driving assembly substrate, the optical element at least partially overlaps the second insulating layer. The driving assembly substrate is disposed on the movable part frame.

In one of the embodiments of the present disclosure, the second driving assembly substrate surface faces the movable part frame. When viewed along a direction that is perpendicular to the thickness of the driving assembly substrate, the second coil assembly partially overlaps the movable part frame. The second supporting assembly and the driving assembly substrate have an integrated structure.

In one of the embodiments of the present disclosure, the first magnetic element is fixedly disposed on the fixed part. The third magnetic element is fixedly disposed on the fixed part. The movable part frame forms a first space with a hollow structure and is used for accommodating a part of the driving assembly. The third magnetic element is located in the first space when viewed along the second axis.

In one of the embodiments of the present disclosure, the first magnetic element is not located in the first space when viewed along the second axis. The movable part frame does not overlap the first magnetic element when viewed along the second axis. The movable part frame does not overlap the third magnetic element when viewed along the second axis. The movable part frame is movable relative to the fixed part in a first movement range. When the movable part frame is located at any position within the first movement range, the movable part is not in contact with the first magnetic element when viewed along the second axis. When the movable part frame is located at any position within the first movement range, the movable part is not in contact with the third magnetic element when viewed along the second axis.

In one of the embodiments of the present disclosure, the optical element driving mechanism further includes a circuit assembly. The driving assembly further includes: a first electrical connection element, wherein the driving assembly is electrically connected to the circuit assembly through the first electrical connection element; and a second electrical connection element, wherein the driving assembly is electrically connected to the circuit assembly through the second electrical connection element. The circuit assembly is fixedly disposed on the fixed part. The circuit assembly is used for electrical connection with an external circuit. The first electrical connection element is flexible.

In one of the embodiments of the present disclosure, a first buffering element is disposed at the junction of the first electrical connection element and the fixed part. The first buffering element is made of a resin material. The first buffering element is flexible. The first buffering element is in direct contact with the first electrical connection element.

The first buffering element is in direct contact with the circuit assembly. The first buffering element is in direct contact with the fixed part.

In one of the embodiments of the present disclosure, a second buffering element is disposed at the junction of the first electrical connection element and the movable part. The second buffering element is made of a resin material. The second buffering element is flexible. The second buffering element is in direct contact with the first electrical connection element. The second buffering element is in direct contact with the first coil assembly. The second buffering element is in direct contact with the movable part. The second buffering element is in direct contact with the driving assembly substrate. The second buffering element is in direct contact with the movable part frame. The first electrical connection element and the second electrical connection element are located at opposite sides of the optical element when viewed along the second axis. The first electrical connection element is located at the corner of the optical element driving mechanism with a polygonal structure when viewed along the second axis.

BRIEF DESCRIPTION OF THE DRAWINGS

The present invention may be more fully understood by reading the subsequent detailed description and examples with references made to the accompanying drawings, wherein.

DETAILED DESCRIPTION OF THE INVENTION

The making and using of optical element driving mechanisms of embodiments of the present disclosure are discussed in detail below. It should be appreciated, however, that the embodiments provide many applicable inventive concepts that may be embodied in a wide variety of specific contexts. The specific embodiments discussed are merely illustrative of specific ways to make and use the embodiments and do not limit the scope of the disclosure.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The scale of the drawings in the present disclosure may be drawn according to the actual size. The scale of the same figure in the present disclosure can be used as the actual manufacturing scale of the devices, equipment, elements, etc. of the present disclosure. It should be noted that each figure may be drawn at different orientations, which may result in different size ratios among different figures. However, the size ratio shown in an individual figure is not affect by the different size ratios between different figures. People with ordinary skill in the art can understand that the size ratio of the figures in the present disclosure can be used as a distinguishing feature from the prior art.

Figure 1:
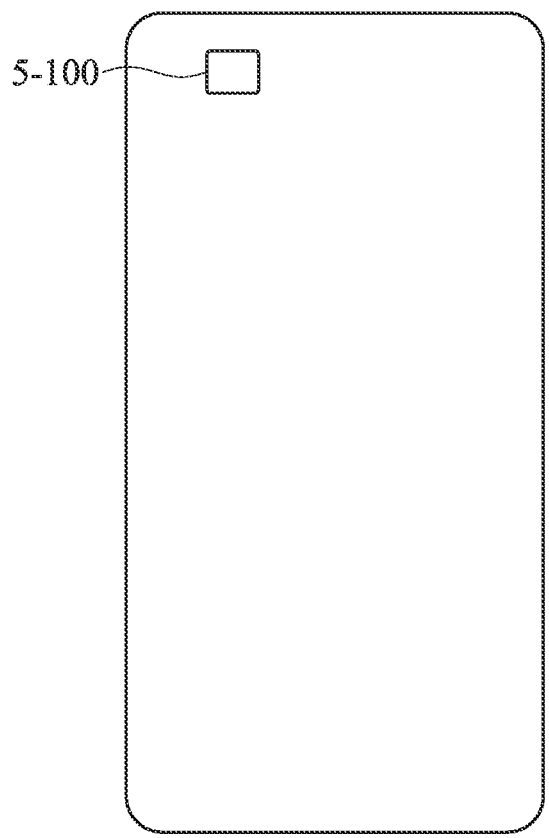
FIG. 1 is a schematic view of an electrical device according to some embodiment of the present disclosure.

Firstly, please refer to FIG. 1, FIG. 1 is a schematic view of an electrical device 5-1 according to some embodiment of the present disclosure. As shown in FIG. 1, an optical element driving mechanism 5-100 of some embodiment of the present disclosure may be mounted in an electrical device 5-1 for taking photos or videos, wherein the aforementioned electrical device 5-1 may, for example, be a smartphone or a digital camera, but the present disclosure is not limited to these. It should be noted that the position and the size between the optical element driving mechanism 5-100 and the electrical device 5-1 shown in FIG. 1 are only an example, which is not for limiting the position and the size between the optical element driving mechanism 5-100 and the electrical device 5-1. In fact, according to different needs, the optical element driving mechanism 5-100 may be mounted at different positions in the electrical device 5-1

Figure 2:
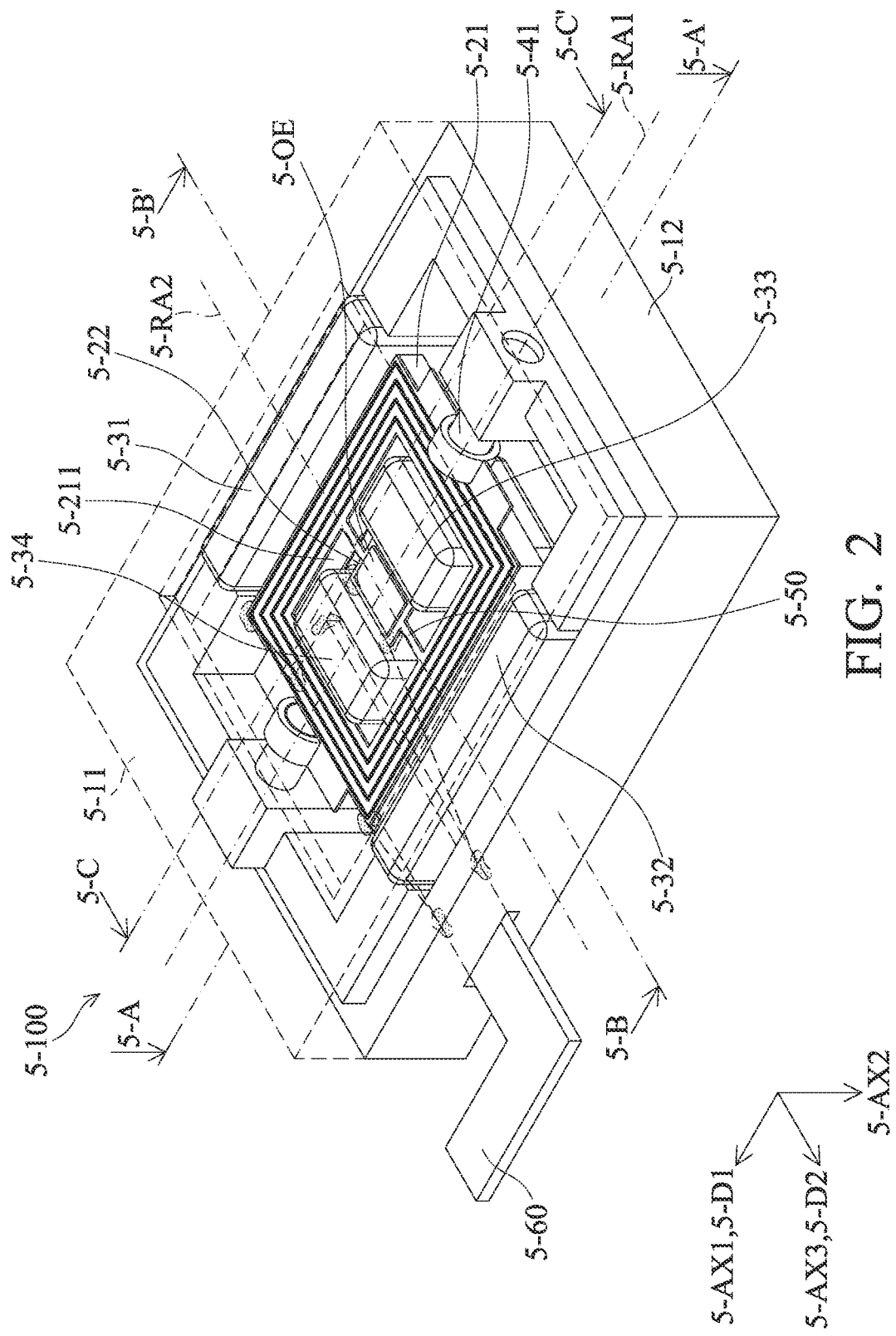
FIG. 2 is a schematic view of an optical element driving mechanism and an optical element according to some embodiments of the present disclosure, wherein an outer frame is shown as a dashed line.
Figure 3:
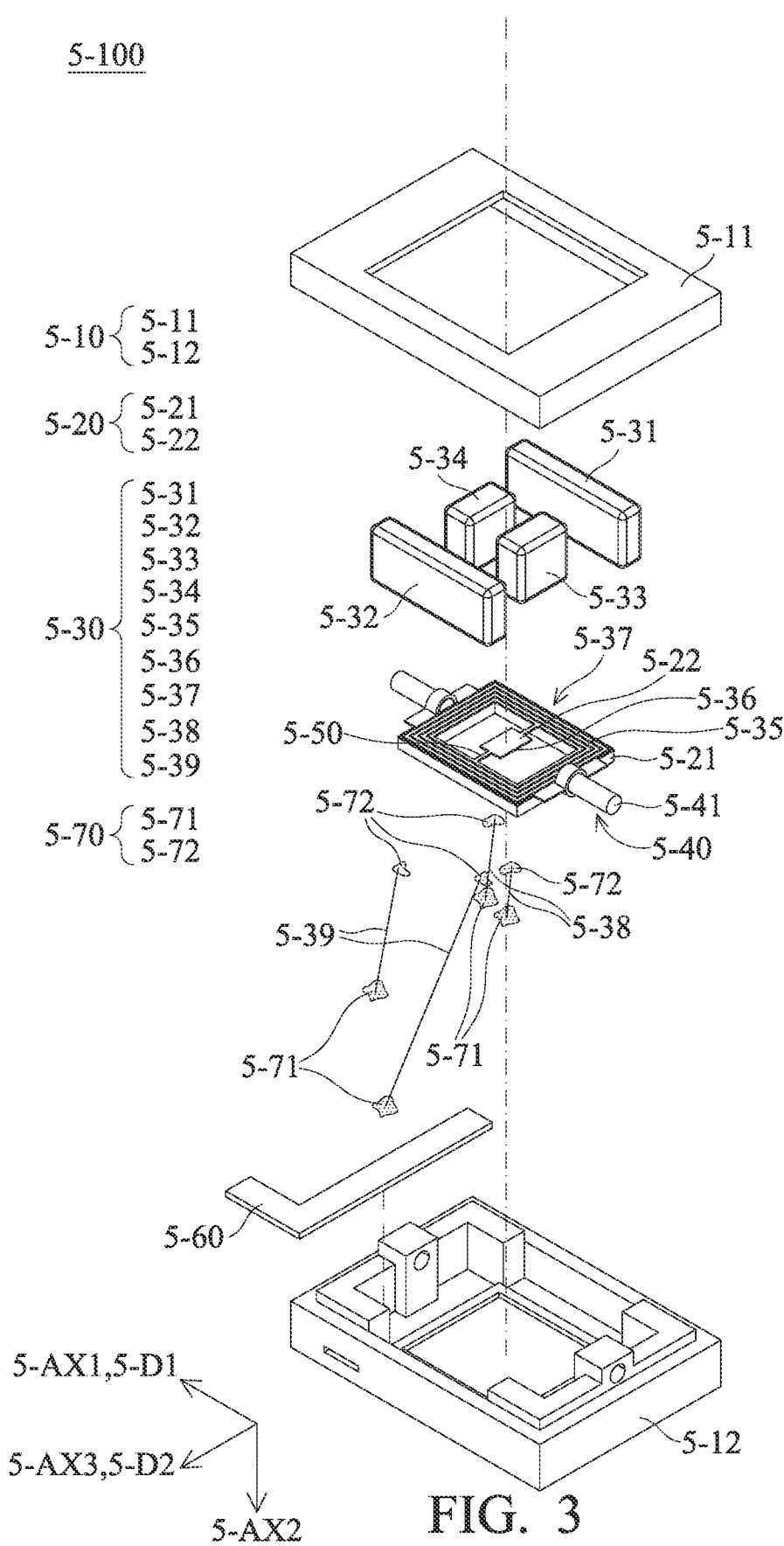
FIG. 3 is an exploded view of the optical element driving mechanism according to some embodiments of the present disclosure.

Please refer to FIG. 2. FIG. 2 is a schematic view of the optical element driving mechanism 5-100 and an optical element 5-OE according to some embodiments of the present disclosure, wherein the outer frame is shown as a dashed line. FIG. 3 is an exploded view of the optical element driving mechanism 5-100 according to some embodiments of the present disclosure.

As shown in FIG. 2 and FIG. 3, the optical element driving mechanism 5-100 may include a fixed part 5-10, a movable part 5-20, a driving assembly 5-30, a first supporting assembly 5-40, a second supporting assembly 5-50, a circuit assembly 5-60, and a buffering element 5-70.

The movable part 5-20 may move relative to the fixed part 5-10, and the driving assembly 5-30 may drive the movable part 5-20 to move relative to the fixed part 5-10. The movable part 5-20 may be connected with an optical element 5-OE, and the movable part 5-20 may move relative to the fixed part 5-10 through the support of the first supporting assembly 5-40.

According to some embodiments of the present disclosure, the first supporting assembly 5-40 may be at least partially located between the movable part 5-20 and the fixed part 5-10. According to some embodiments of the present disclosure, the driving assembly 5-30 may be used to drive the movable part 5-20 to move in a first dimension 5-D1.

The fixed part 5-10 may include an outer frame 5-11, and a base 5-12. The outer frame 5-11 may be disposed on the base 5-12, so as to form an inner space, and the inner space may accommodate the elements of the optical element driving mechanism 5-100.

The movable part 5-20 may include a movable part frame 5-21, and a movable part setting surface 5-22. According to some embodiments of the present disclosure, the movable part setting surface 5-22 may correspond to the optical element 5-OE.

According to some embodiments of the present disclosure, the movable part setting surface 5-22 may be parallel to a first axis 5-AX1. According to some embodiments of the present disclosure, the movable part setting surface 5-22 may be perpendicular to a second axis 5-AX2. According to some embodiments of the present disclosure, the movable part setting surface 5-22 may be parallel to a third axis 5-AX3.

According to some embodiments of the present disclosure, the first axis 5-AX1 may be perpendicular to the second axis 5-AX2. According to some embodiments of the present disclosure, the first axis 5-AX1 may be perpendicular to the third axis 5-AX3. According to some embodiments of the present disclosure, the second axis 5-AX2 may be perpendicular to the third axis 5-AX3.

According to some embodiments of the present disclosure, the optical element driving mechanism 5-100 may have an elongated structure when viewed along the second axis 5-AX2. According to some embodiments of the present disclosure, the optical element driving mechanism 5-100 may extend along the first axis 5-AX1.

According to some embodiments of the present disclosure, the driving assembly 5-30 may be used to drive the optical element 5-OE to move relative to the fixed part 5-10 in the first dimension 5-D1.

According to some embodiments of the present disclosure, the driving assembly 5-30 may be used to drive the movable part frame 5-21 to move relative to the fixed part 5-10 in the first dimension 5-D1.

According to some embodiments of the present disclosure, the first dimension 5-D1 may be a rotation about a first rotation axis 5-RA1. According to some embodiments of the present disclosure, the first rotation axis 5-RA1 may be parallel to the first axis 5-AX1.

According to some embodiments of the present disclosure, the driving assembly 5-30 may be used to drive the movable part setting surface 5-22 of the movable part 5-20 to move relative to the movable part frame 5-21 in a second dimension 1-D2.

According to some embodiments of the present disclosure, the driving assembly 5-30 may be used to drive the optical element 5-OE to move in the second dimension 1-D2.

According to some embodiments of the present disclosure, the second dimension 1-D2 is different from the first dimension 5-D1. According to some embodiments of the present disclosure, the second dimension 1-D2 may be perpendicular to the first dimension 5-D1.

According to some embodiments of the present disclosure, the second dimension 1-D2 may be a rotation about a second rotation axis 5-RA2. According to some embodiments of the present disclosure, the second axis 5-RA2 may be parallel to the third axis 5-AX3.

According to some embodiments of the present disclosure, the driving assembly 5-30 may include a first magnetic element 5-31, a second magnetic element 5-32, a third magnetic element 5-33, a fourth magnetic element 5-34, s first coil assembly 5-35, a second coil assembly 5-36, a driving assembly substrate 5-37, a first electrical connection element 5-38, and a second electrical connection element 5-39.

According to some embodiments of the present disclosure, the first supporting assembly 5-40 may include a first supporting element 5-41. According to some embodiments of the present disclosure, the circuit assembly 5-60 may be electrically connected to the driving assembly 5-30 to electrically connect the driving assembly 5-30 to an external circuit.

According to some embodiments of the present disclosure, the optical element 5-OE may move relative to the movable part 5-20 via the second supporting assembly 5-50. According to some embodiments of the present disclosure, the optical element 5-OE may move relative to the movable part frame 5-21 via the second supporting assembly 5-50. According to some embodiments of the present disclosure, the movable part setting surface 5-22 is movable relative to the movable part frame 5-21 via the second supporting assembly 5-50.

According to some embodiments of the present disclosure, the buffering element 5-70 may include a first buffering element 5-71 and a second buffering element 5-72.

Figure 4:
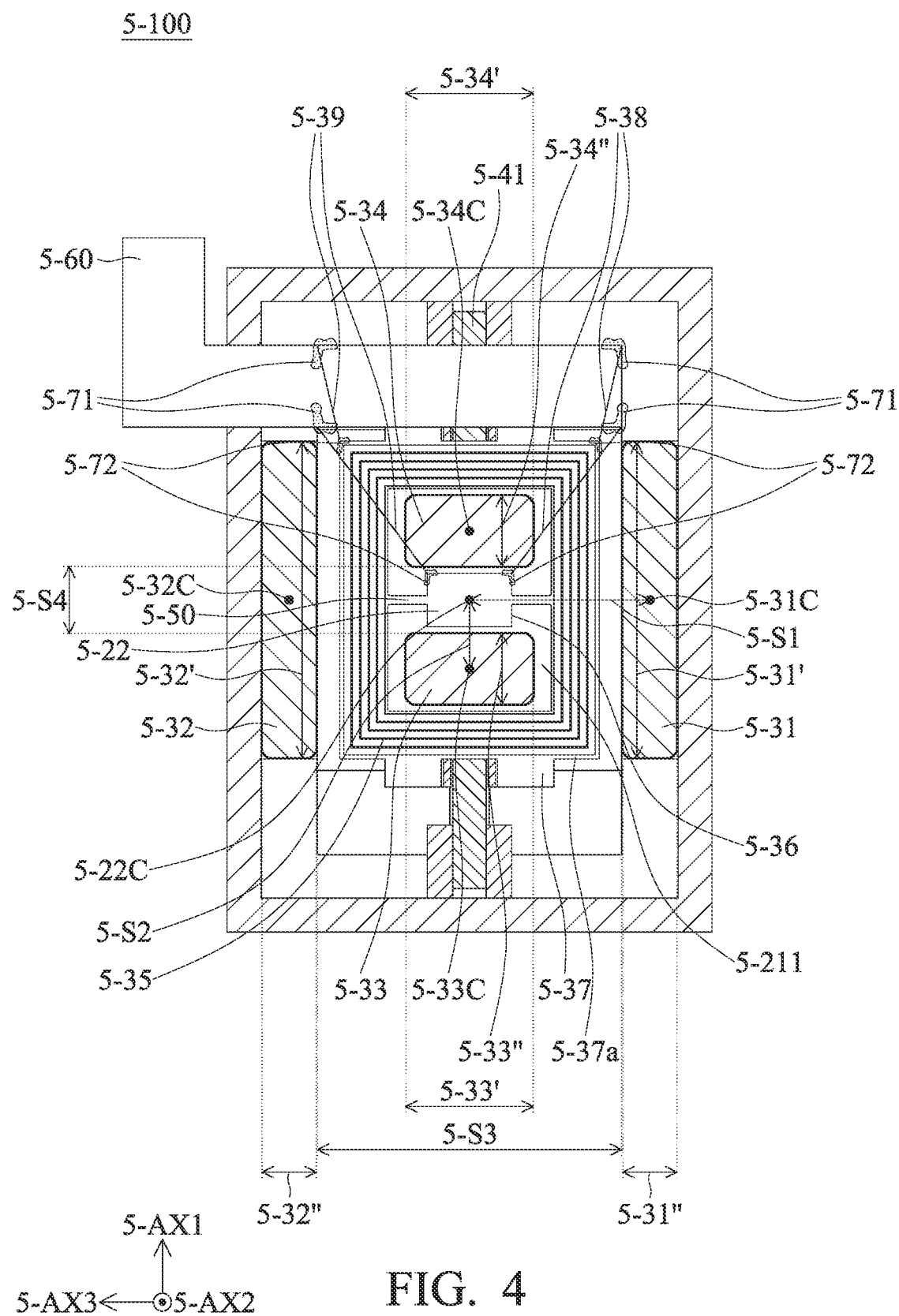
FIG. 4 is a cross-sectional view of the optical element driving mechanism along line 5-A-5-A' of FIG. 2, according to some embodiments of the present disclosure.
Figure 5:
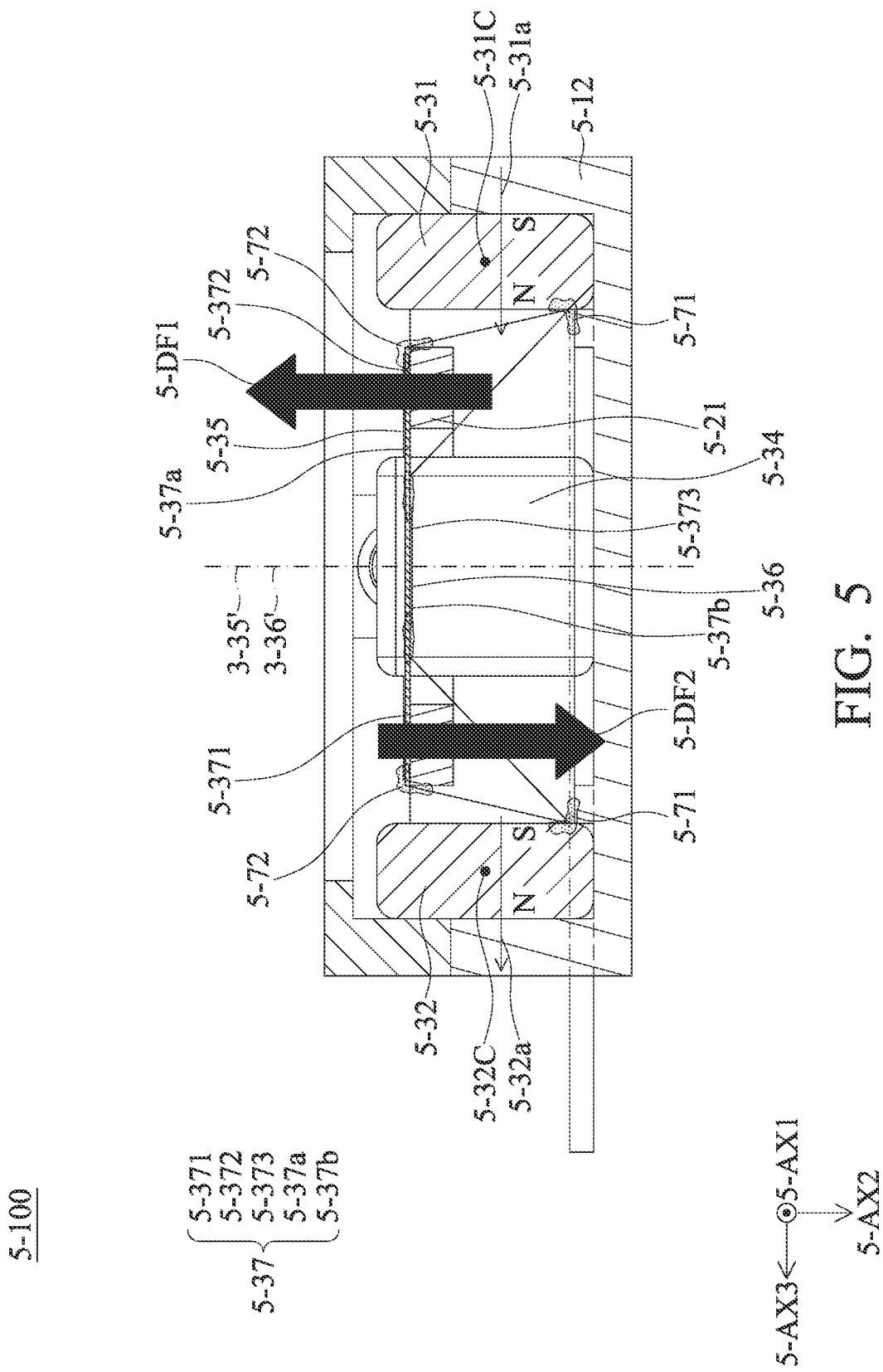
FIG. 5 is a cross-sectional view of the optical element driving mechanism along line 5-B-5-B' of FIG. 2, according to some embodiments of the present disclosure.

Please refer to FIG. 4 and FIG. 5, FIG. 4 is a cross-sectional view of the optical element driving mechanism 5-100 along line 5-A-5-A' of FIG. 2, according to some embodiments of the present disclosure; FIG. 5 is a cross-sectional view of the optical element driving mechanism 5-100 along line 5-B-5-B' of FIG. 2, according to some embodiments of the present disclosure.

As shown in FIG. 4 and FIG. 5, according to some embodiments of the present disclosure, the first coil assembly 5-35 may correspond to the first magnetic element 5-31. According to some embodiments of the present disclosure, the first coil assembly 5-35 may be disposed adjacent to the first magnetic element 5-31.

According to some embodiments of the present disclosure, the second magnetic element 5-32 may correspond to the first coil assembly 5-35. According to some embodiments of the present disclosure, the second magnetic element 5-32 may be disposed adjacent to the first coil assembly 5-35.

According to some embodiments of the present disclosure, the second coil assembly 5-36 may correspond to the third magnetic element 5-33. According to some embodiments of the present disclosure, the second coil assembly 5-36 may be disposed adjacent to the third magnetic element 5-33.

According to some embodiments of the present disclosure, the fourth magnetic element 5-34 may correspond to the second coil assembly 5-36. According to some embodiments of the present disclosure, the fourth magnetic element 5-34 may be disposed adjacent to the second coil assembly 5-36.

Please refer to FIG. 4 and FIG. 5, according to some embodiments of the present disclosure, the first magnetic element 5-31 may be used to correspond to the movable part frame 5-21 of the movable part 5-20 to generate a first driving force 5-DF1. The first driving force 5-DF1 may be represented by an arrow.

According to some embodiments of the present disclosure, the first driving force 5-DF1 may be used to move the movable part frame 5-21 relative to the fixed part 5-10 in the first dimension 5-D1.

According to some embodiments of the present disclosure, the second magnetic element 5-32 may be used to generate a second driving force 5-DF2 to the movable part frame 5-21. The second driving force 5-DF2 may be represented by an arrow.

As shown in FIG. 4 and FIG. 5, according to some embodiments of the present disclosure, the second driving force 5-DF2 may be used to move the movable part frame 5-21 relative to the fixed part 5-10 in the first dimension 5-D1.

According to some embodiments of the present disclosure, the direction of the first driving force 5-DF1 may be parallel to the direction of the second driving force 5-DF2.

According to some embodiments of the present disclosure, the magnetic pole alignment direction 5-31a (for example, the direction from the south-seeking pole to the north-seeking pole) of the first magnetic element 5-31 and the magnetic pole alignment direction 5-32a (for example, the direction from the south-seeking pole to the north-seeking pole) of the second magnetic element 5-32 may be the same.

For example, according to some embodiments of the present disclosure, the magnetic pole alignment direction 5-31a of the first magnetic element 5-31 may be the positive direction of the third axis 5-AX3; and the magnetic pole alignment direction 5-32a of the second magnetic element 5-32 may also be the positive direction of the third axis 5-AX3.

For example, according to some embodiments of the present disclosure, the magnetic pole alignment direction 5-31a of the first magnetic element 5-31 may be the opposite direction of the third axis 5-AX3; and the magnetic pole alignment direction 5-32a of the second magnetic element 5-32 may also be the opposite direction of the third axis 5-AX3.

Please refer to FIG. 2, FIG. 4 and FIG. 5, according to some embodiments of the present disclosure, the first magnetic element 5-31 and the second magnetic element 5-32 may be located at the two opposite sides of the optical element 5-OE when viewed along the second axis 5-AX2.

According to some embodiments of the present disclosure, the first magnetic element 5-31 and the second magnetic element 5-32 may be located at the two opposite sides of the first rotation axis 5-RA1 when viewed along the second axis 5-AX2.

According to some embodiments of the present disclosure, the line that connects the center 5-31C of the first magnetic element 5-31 and the center 5-32C of the second magnetic element 5-32 may pass through the optical element 5-OE when viewed along the second axis 5-AX2.

In this way, the driving assembly 5-30 may drive the optical element 5-OE to move along the first rotation axis 5-RA1 more effectively, thereby making the operation of the optical element driving mechanism 5-100 smoother.

Figure 6:
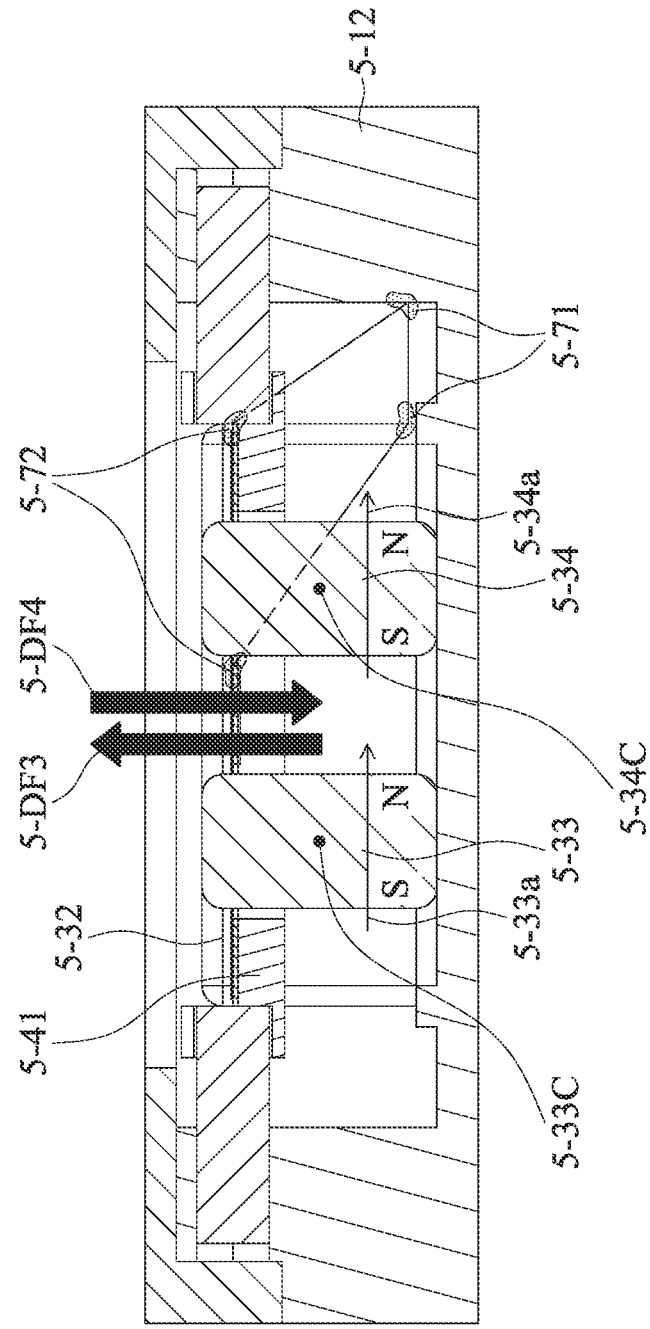
FIG. 6 is a cross-sectional view of the optical element driving mechanism along line 5-C-5-C' of FIG. 2, according to some embodiments of the present disclosure.

Please refer to FIG. 4 and FIG. 6, FIG. 6 is a cross-sectional view of the optical element driving mechanism 5-100 along line 5-C-5-C' of FIG. 2, according to some embodiments of the present disclosure.

As shown in FIG. 4 and FIG. 6, according to some embodiments of the present disclosure, the third magnetic element 5-33 may be used to generate a third driving force 5-DF3 to the movable part setting surface 5-22 of the movable part 5-20. The third driving force 5-DF3 is represented by an arrow.

According to some embodiments of the present disclosure, the third driving force 5-DF3 may be used to move the movable part setting surface 5-22 relative to the movable part frame 5-21 in the second dimension 1-D2.

According to some embodiments of the present disclosure, the fourth magnetic element 5-34 may be used to generate a fourth driving force 5-DF4 to the movable part setting surface 5-22. The fourth driving force 5-DF4 is represented by an arrow.

According to some embodiments of the present disclosure, the fourth driving force 5-DF4 may be used to move the movable part setting surface 5-22 relative to the movable part frame 5-21 in the second dimension 1-D2.

Please refer to FIG. 4 and FIG. 6, according to some embodiments of the present disclosure, the direction of the third driving force 5-DF3 may be parallel to the direction of the fourth driving force 5-DF4.

According to some embodiments of the present disclosure, the magnetic pole alignment direction 5-33a (for example, the direction from the south-seeking pole to the north-seeking pole) of the third magnetic element 5-33 and the magnetic pole alignment direction 5-34a (for example, the direction from the south-seeking pole to the north-seeking pole) of the fourth magnetic element 5-34 may be the same.

For example, according to some embodiments of the present disclosure, the magnetic pole alignment direction 5-33a of the third magnetic element 5-33 may be the positive direction of the first axis 5-AX1; and the magnetic pole alignment direction 5-34a of the fourth magnetic element 5-34 may also be the positive direction of the first axis 5-AX1.

For example, according to some embodiments of the present disclosure, the magnetic pole alignment direction 5-33a of the third magnetic element 5-33 may be the opposite direction of the first axis 5-AX1; and the magnetic pole alignment direction 5-34a of the fourth magnetic element 5-34 may also be the opposite direction of the first axis 5-AX1.

As shown in FIG. 4 and FIG. 6, according to some embodiments of the present disclosure, the third magnetic element 5-33 and the fourth magnetic element 5-34 may be located at the opposite sides of the optical element OE when viewed along the second axis 5-AX2.

According to some embodiments of the present disclosure, the third magnetic element 5-33 and the fourth magnetic element 5-34 may be located at the opposite sides of the second rotation axis 5-RA2 when viewed along the second axis 5-AX2.

According to some embodiments of the present disclosure, the line that connects the center 5-33C of the third magnetic element 5-33 and the center 5-34C of the fourth magnetic element 5-34 may pass through the optical element 5-OE when viewed along the second axis 5-AX2.

In this way, the driving assembly 5-30 may drive the optical element 5-OE to move along the second rotation axis 5-RA2 more effectively, thereby making the operation of the optical element driving mechanism 5-100 smoother.

Please refer to FIG. 5 and FIG. 6, according to some embodiments of the present disclosure, the direction of the first driving force 5-DF1 may be parallel to the direction of the third driving force 5-DF3.

Please refer to FIG. 4, FIG. 5 and FIG. 6, according to some embodiments of the present disclosure, the magnetic pole alignment direction 5-31a of the first magnetic element 5-31 may not be parallel to the magnetic pole alignment direction 5-33a of the third magnetic element 5-33.

According to some embodiments of the present disclosure, the magnetic pole alignment direction 5-31a of the first magnetic element 5-31 may be perpendicular to the magnetic pole alignment direction 5-33a of the third magnetic element 5-33.

As shown in FIG. 4, FIG. 5 and FIG. 6, according to some embodiments of the present disclosure, the alignment direction of the center 5-31C of the first magnetic element 5-31 and the center 5-32C of the second magnetic element 5-32 may not be parallel to the alignment direction of the center 5-33C of the third magnetic element 5-33 and the center 5-34C of the fourth magnetic element 5-34.

According to some embodiments of the present disclosure, the alignment direction of the center 5-31C of the first magnetic element 5-31 and the center 5-32C of the second magnetic element 5-32 may be perpendicular to the alignment direction of the center 5-33C of the third magnetic element 5-33 and the center 5-34C of the fourth magnetic element 5-34.

Please refer to FIG. 4, FIG. 5 and FIG. 6, according to some embodiments of the present disclosure, when viewed along the second axis 5-AX2, the shortest distance 5-S1 between the first magnetic element 5-31 and the center 5-22C of the movable part setting surface 5-22 may be different from the shortest distance 5-S2 of the third magnetic element 5-33 and the center 5-22C of the movable part setting surface 5-22.

According to some embodiments of the present disclosure, when viewed along the second axis 5-AX2, the shortest distance 5-S1 between the first magnetic element 5-31 and the center 5-22C of the movable part setting surface 5-22 may be greater than the shortest distance 5-S2 of the third magnetic element 5-33 and the center 5-22C of the movable part setting surface 5-22.

As shown in FIG. 4, FIG. 5 and FIG. 6, according to some embodiments of the present disclosure, when viewed along the second axis 5-AX2, the shortest distance 5-S3 between the first magnetic element 5-31 and the second magnetic element 5-32 may be different from the shortest distance 5-S4 between the third magnetic element 5-33 and the fourth magnetic element 5-34.

According to some embodiments of the present disclosure, when viewed along the second axis 5-AX2, the shortest distance 5-S3 between the first magnetic element 5-31 and the second magnetic element 5-32 may be greater than the shortest distance 5-S4 between the third magnetic element 5-33 and the fourth magnetic element 5-34.

Please refer to FIG. 4, FIG. 5 and FIG. 6, according to some embodiments of the present disclosure, when viewed along the magnetic pole alignment direction 5-31a (for example, may be parallel to the third axis AX3) of the first magnetic element 5-31, the first magnetic element 5-31 may partially overlap the second magnetic element 5-32.

According to some embodiments of the present disclosure, when viewed along the magnetic pole alignment direction 5-31a (for example, may be parallel to the third axis 5-AX3) of the first magnetic element 5-31, the first magnetic element 5-31 may partially overlap the third magnetic element 5-33.

According to some embodiments of the present disclosure, when viewed along the magnetic pole alignment direction 5-31a (for example, may be parallel to the third axis 5-AX3) of the first magnetic element 5-31, the first magnetic element 5-31 may partially overlap the fourth magnetic element 5-34.

As shown in FIG. 4, FIG. 5 and FIG. 6, according to some embodiments of the present disclosure, when viewed along the magnetic pole alignment direction 5-31a (for example, may be parallel to the third axis 5-AX3) of the first magnetic element 5-31, the second magnetic element 5-32 may partially overlap the third magnetic element 5-33.

According to some embodiments of the present disclosure, when viewed along the magnetic pole alignment direction 5-31a (for example, parallel to the third axis 5-AX3) of the first magnetic element 5-31, the second magnetic element 5-32 may partially overlap the fourth magnetic element 5-34.

Please refer to FIG. 4, FIG. 5 and FIG. 6, according to some embodiments of the present disclosure, when viewed along the magnetic pole alignment direction 5-31a (for example, may be parallel to the third axis AX3) of the first magnetic element 5-31, the third magnetic element 5-33 may not overlap the fourth magnetic element 5-34.

In this way, the magnetic interference of the driving assembly 5-30 may be avoided, thereby facilitating the movement of the driving optical element 5-OE. In addition, the internal space of the optical element driving mechanism 5-100 may be effectively used, thereby the effect of miniaturization is achieved.

As shown in FIG. 4, FIG. 5 and FIG. 6, according to some embodiments of the present disclosure, when viewed along the magnetic pole alignment direction 5-33a (for example, may be parallel to the first axis 5-AX1) of the third magnetic element 5-33, the first magnetic element 5-31 may not overlap the second magnetic element 5-32.

According to some embodiments of the present disclosure, when viewed along the magnetic pole alignment direction 5-33a (for example, may be parallel to the first axis 5-AX1) of the third magnetic element 5-33, the first magnetic element 5-31 may not overlap the third magnetic element 5-33.

According to some embodiments of the present disclosure, when viewed along the magnetic pole alignment direction 5-33a (for example, may be parallel to the first axis 5-AX1) of the third magnetic element 5-33, the first magnetic element 5-31 may not overlap the fourth magnetic element 5-34.

Please refer to FIG. 4, FIG. 5 and FIG. 6, according to some embodiments of the present disclosure, when viewed along the magnetic pole alignment direction 5-33a (for example, may be parallel to the first axis 5-AX1) of the third magnetic element 5-33, the second magnetic element 5-32 may not overlap the third magnetic element 5-33.

According to some embodiments of the present disclosure, when viewed along the magnetic pole alignment direction 5-33a (for example, may be parallel to the first axis 5-AX1) of the third magnetic element 5-33, the second magnetic element 5-32 may not overlap the fourth magnetic element 5-34.

As shown in FIG. 4, FIG. 5 and FIG. 6, according to some embodiments of the present disclosure, when viewed along the magnetic pole alignment direction 5-33a (for example, may be parallel to the first axis 5-AX1) of the third magnetic element 5-33, the third magnetic element 5-33 may partially overlap the fourth magnetic element 5-34.

In this way, the magnetic interference of the driving assembly 5-30 may be avoided, thereby facilitating the movement of the driving optical element 5-OE. In addition, the internal space of the optical element driving mechanism 5-100 may be effectively used, thereby the effect of miniaturization is achieved.

Please refer to FIG. 4, FIG. 5, and FIG. 6, according to some embodiments of the present disclosure, when viewed along the second axis 5-AX2, the first magnetic element 5-31, the second magnetic element 5-32, the third magnetic element 5-33, and the fourth magnetic element 5-34 may have elongated structures.

According to some embodiments of the present disclosure, the length 5-31' of the first magnetic element 5-31 may be the same as the length 5-32' of the second magnetic element 5-32 when viewed along the second axis 5-AX2.

According to some embodiments of the present disclosure, the length 5-31' of the first magnetic element 5-31 may be greater than the length 5-33' of the third magnetic element 5-33 when viewed along the second axis 5-AX2.

According to some embodiments of the present disclosure, the length 5-31' of the first magnetic element 5-31 may be greater than the length 5-34' of the fourth magnetic element 5-34 when viewed along the second axis 5-AX2.

As shown in FIG. 4, FIG. 5 and FIG. 6, according to some embodiments of the present disclosure, the length 5-33' of the third magnetic element 5-33 may be the same as the length 5-34' of the fourth magnetic element 5-34 when viewed along the second axis 5-AX2.

According to some embodiments of the present disclosure, the width 5-31" of the first magnetic element 5-31 may be the same as the width 5-32" of the second magnetic element 5-32 when viewed along the second axis 5-AX2.

According to some embodiments of the present disclosure, the width 5-31" of the first magnetic element 5-31 may be shorter than the width 5-33" of the third magnetic element 5-33 when viewed along the second axis 5-AX2.

According to some embodiments of the present disclosure, the width 5-31" of the first magnetic element 5-31 may be shorter than the width 5-34" of the fourth magnetic element 5-34 when viewed along the second axis 5-AX2.

According to some embodiments of the present disclosure, the width 5-33" of the third magnetic element 5-33 may be the same as the width 5-34" of the fourth magnetic element 5-34 when viewed along the second axis 5-AX2.

In this way, the internal space of the optical element driving mechanism 5-100 may be effectively utilized, thereby the effect of miniaturization is achieved.

Please refer to FIG. 4, FIG. 5, and FIG. 6, according to some embodiments of the present disclosure, the first supporting element 5-41 may have an elongated structure. According to some embodiments of the present disclosure, the first supporting element 5-41 may move relative to the fixed part 5-10 or the movable part frame 5-21.

According to some embodiments of the present disclosure, the second supporting assembly 5-50 may be flexible. According to some embodiments of the present disclosure, the second supporting assembly 5-50 may partially fixedly connect to the movable part setting surface 5-22 and the movable part frame 5-21.

As shown in FIG. 4, FIG. 5 and FIG. 6, according to some embodiments of the present disclosure, the first magnetic element 5-31 may not overlap the first supporting element 5-41 when viewed along the first axis 5-AX1.

According to some embodiments of the present disclosure, the second magnetic element 5-32 may not overlap the first supporting element 5-41 when viewed along the first axis 5-AX1.

According to some embodiments of the present disclosure, the third magnetic element 5-33 may at least partially overlap the first supporting element 5-41 when viewed along the first axis 5-AX1.

According to some embodiments of the present disclosure, the fourth magnetic element 5-34 may at least partially overlap the first supporting element 5-41 when viewed along the first axis 5-AX1.

Please refer to FIG. 4, FIG. 5, and FIG. 6, according to some embodiments of the present disclosure, the first magnetic element 5-31, the second magnetic element 5-32, the third magnetic element 5-33 and the fourth magnetic element 5-34 may not overlap the first supporting element 5-41 when viewed along the second axis 5-AX2.

As shown in FIG. 4, FIG. 5 and FIG. 6, according to some embodiments of the present disclosure, the first magnetic element 5-31 may at least partially overlap the first supporting element 5-41 when viewed along the third axis 5-AX3.

According to some embodiments of the present disclosure, the second magnetic element 5-32 may at least partially overlap the first supporting element 5-41 when viewed along the third axis 5-AX3.

According to some embodiments of the present disclosure, the third magnetic element 5-33 may not overlap the first supporting element 5-41 when viewed along the third axis 5-AX3.

According to some embodiments of the present disclosure, the fourth magnetic element 5-34 may not overlap the first supporting element 5-41 when viewed along the third axis 5-AX3.

In this way, the internal space of the optical element driving mechanism 5-100 may be effectively utilized, thereby the effect of miniaturization is achieved.

As shown in FIG. 4, FIG. 5 and FIG. 6, according to some embodiments of the present disclosure, the first magnetic element 5-31 may not overlap the second supporting assembly 5-50 when viewed along the first axis 5-AX1.

According to some embodiments of the present disclosure, the second magnetic element 5-32 may not overlap the second supporting assembly 5-50 when viewed along the first axis 5-AX1.

According to some embodiments of the present disclosure, the third magnetic element 5-33 may at least partially overlap the second supporting assembly 5-50 when viewed along the first axis 5-AX1.

According to some embodiments of the present disclosure, the fourth magnetic element 5-34 may at least partially overlap the second supporting assembly 5-50 when viewed along the first axis 5-AX1.

Please refer to FIG. 4, FIG. 5, and FIG. 6, according to some embodiments of the present disclosure, the first magnetic element 5-31, the second magnetic element 5-32, the third magnetic element 5-33 and the fourth magnetic element 5-34 may not overlap the second supporting assembly 5-50 when viewed along the second axis 5-AX2.

As shown in FIG. 4, FIG. 5 and FIG. 6, according to some embodiments of the present disclosure, the first magnetic element 5-31 may at least partially overlap the second supporting assembly 5-50 when viewed along the third axis 5-AX3.

According to some embodiments of the present disclosure, the second magnetic element 5-32 may at least partially overlap the second supporting assembly 5-50 when viewed along the third axis 5-AX3.

According to some embodiments of the present disclosure, the third magnetic element 5-33 may not overlap the second supporting assembly 5-50 when viewed along the third axis 5-AX3.

According to some embodiments of the present disclosure, the fourth magnetic element 5-34 may not overlap the second supporting assembly 5-50 when viewed along the third axis 5-AX3.

In this way, the internal space of the optical element driving mechanism 5-100 may be effectively utilized, thereby the effect of miniaturization is achieved.

Please refer to FIG. 4, FIG. 5 and FIG. 6, according to some embodiments of the present disclosure, the driving assembly substrate 5-37 may include a driving assembly substrate body 5-371, a first insulating layer 5-372, a second insulation layer 5-373, a first driving assembly substrate surface 5-37*a*, and a second driving assembly substrate surface 5-37*b*.

According to some embodiments of the present disclosure, the first coil assembly 5-35 may be disposed on the driving assembly substrate 5-37. According to some embodiments of the present disclosure, the driving assembly substrate 5-37 may have a plate-like structure.

According to some embodiments of the present disclosure, the first coil assembly 5-35 may be disposed on the first driving assembly substrate surface 5-37*a* of the driving assembly substrate 5-37.

According to some embodiments of the present disclosure, the second coil assembly 5-36 may be disposed on the driving assembly substrate 5-37.

According to some embodiments of the present disclosure, the second coil assembly 5-36 may be disposed on the second driving assembly substrate surface 5-37*b* of the driving assembly substrate 5-37.

As shown in FIG. 4, FIG. 5 and FIG. 6, according to some embodiments of the present disclosure, the first driving assembly substrate surface 5-37*a* and the second driving assembly substrate surface 5-37*b* may face different directions.

According to some embodiments of the present disclosure, the first driving assembly substrate surface 5-37*a* and the second driving assembly substrate surface 5-37*b* may face opposite directions.

According to some embodiments of the present disclosure, when viewed along a direction that is perpendicular to the thickness of the driving assembly substrate 5-37 (for example, may be any direction that is perpendicular to the second axis 5-AX2), the first coil assembly 5-35 and the second coil assembly 5-36 may be located on opposite sides of the driving assembly substrate 5-37.

In this way, the first coil assembly 5-35 and the second coil assembly 5-36 may be effectively prevented from being short-circuited with each other, thereby the reliability of the optical element driving mechanism 5-100 is improved.

Please refer to FIG. 4, FIG. 5 and FIG. 6, according to some embodiments of the present disclosure, when viewed along the first coil assembly winding axis 5-35' of the first coil assembly 5-35, the first coil assembly 5-35 and the second coil assembly 5-36 may not overlap each other.

According to some embodiments of the present disclosure, when viewed along the second coil assembly winding axis 5-36' of the second coil assembly 5-36, the second coil assembly 5-36 may at least partially overlap the optical element 5-OE.

According to come embodiments of the present disclosure, the first coil assembly winding axis 5-35' may partially overlap the second coil assembly winding axis 5-36'.

In this way, the internal space of the optical element driving mechanism 5-100 may be effectively utilized, thereby the effect of miniaturization is achieved.

As shown in FIG. 4, FIG. 5 and FIG. 6, according to some embodiments of the present disclosure, the first insulating layer 5-372 may be located between the driving assembly substrate body 5-371 and the first coil assembly 5-35.

According to some embodiments of the present disclosure, the second insulating layer 5-373 may be located between the driving assembly substrate body 5-371 and the second coil assembly 5-36. According to some embodiments of the present disclosure, the driving assembly substrate body 5-371 may be made of metal.

Please refer to FIG. 4, FIG. 5 and FIG. 6, according to some embodiments of the present disclosure, when viewed along the thickness direction of the driving assembly substrate 5-37 (for example, the direction that is parallel to the first axis 5-AX1), the optical element 5-OE may not overlap the first insulating layer 5-372.

According to some embodiments of the present disclosure, when viewed along the thickness direction of the driving assembly substrate 5-37 (for example, the direction that is parallel to the first axis 5-AX1), the optical element 5-OE may at least partially overlap the second insulating layer 5-373.

In this way, the interaction of the driving forces may be effectively avoided, thereby making the operation of the optical element driving mechanism 5-100 smoother.

As shown in FIG. 4, FIG. 5 and FIG. 6, according to some embodiments of the present disclosure, the driving assembly substrate 5-37 may be disposed on the movable part frame 5-21.

According to some embodiments of the present disclosure, the second driving assembly substrate surface 5-37*b* may face the movable part frame 5-21.

According to some embodiments of the present disclosure, when viewed along a direction that is perpendicular to the thickness of the driving assembly substrate 5-37 (for example, any direction that is perpendicular to the second axis 5-AX2), the second coil assembly 5-36 may at least partially overlap the movable part frames 5-21.

According to some embodiments of the present disclosure, the second supporting assembly 5-50 and the driving assembly substrate 5-37 may have an integrated structure. That is, the second supporting assembly 5-50 and the driving assembly substrate 5-37 may not need to be connected by additional means (such as welding).

In this way, the assembly of the optical element driving mechanism 5-100 may be facilitated, thereby the manufacturing cost of the optical element driving mechanism 5-100 is reduced.

Please refer to FIG. 4, FIG. 5 and FIG. 6, according to some embodiments of the present disclosure, the first magnetic element 5-31 may be fixedly disposed on the base 12 of the fixed part 5-10.

According to some embodiments of the present disclosure, the second magnetic element 5-32 may be fixedly disposed on the base 12 of the fixed part 5-10.

According to some embodiments of the present disclosure, the third magnetic element 5-33 may be fixedly disposed on the base 12 of the fixed part 5-10.

According to some embodiments of the present disclosure, the fourth magnetic element 5-34 may be fixedly disposed on the base 12 of the fixed part 5-10.

In this way, the driving assembly may be made more stable, thereby the reliability of the optical element driving mechanism 5-100 is improved.

As shown in FIG. 4, FIG. 5 and FIG. 6, according to some embodiments of the present disclosure, the movable part frame 5-21 may form a first space 5-211. The first space 5-211 may have a hollow structure, and the first space 5-211 may be used to accommodate a part of the driving assembly 5-30.

According to some embodiments of the present disclosure, the first magnetic element 5-31 may not be located in the first space 5-211 when viewed along the second axis 5-AX2.

According to some embodiments of the present disclosure, the second magnetic element 5-32 may not be located in the first space 5-211 when viewed along the second axis 5-AX2.

According to some embodiments of the present disclosure, the third magnetic element 5-33 may be located in the first space 5-211 when viewed along the second axis 5-AX2.

According to some embodiments of the present disclosure, the fourth magnetic element 5-34 may be located in the first space 5-211 when viewed along the second axis 5-AX2.

In this way, the internal space of the optical element driving mechanism 5-100 may be effectively utilized, thereby the effect of miniaturization is achieved.

Please refer to FIG. 4, FIG. 5 and FIG. 6, according to some embodiments of the present disclosure, the movable part frame 5-21 may not overlap the first magnetic element 5-31 when viewed along the first axis 5-AX1.

According to some embodiments of the present disclosure, the movable part frame 5-21 may not overlap the second magnetic element 5-32 when viewed along the first axis 5-AX1.

According to some embodiments of the present disclosure, the movable part frame 5-21 may overlap the third magnetic element 5-33 when viewed along the first axis 5-AX1.

According to some embodiments of the present disclosure, the movable part frame 5-21 may overlap the fourth magnetic element 5-34 when viewed along the first axis 5-AX1.

As shown in FIG. 4, FIG. 5 and FIG. 6, according to some embodiments of the present disclosure, the movable part frame 5-21 may not overlap the first magnetic element 5-31 when viewed along the second axis 5-AX2.

According to some embodiments of the present disclosure, the movable part frame 5-21 may not overlap the second magnetic element 5-32 when viewed along the second axis 5-AX2.

According to some embodiments of the present disclosure, the movable part frame 5-21 may not overlap the third magnetic element 5-33 when viewed along the second axis 5-AX2.

According to some embodiments of the present disclosure, the movable part frame 5-21 may not overlap the fourth magnetic element 5-34 when viewed along the second axis 5-AX2.

Please refer to FIG. 4, FIG. 5 and FIG. 6, according to some embodiments of the present disclosure, the movable part frame 5-21 may overlap the first magnetic element 5-31 when viewed along the third axis 5-AX3.

According to some embodiments of the present disclosure, the movable part frame 5-21 may overlap the second magnetic element 5-32 when viewed along the third axis 5-AX3.

According to some embodiments of the present disclosure, the movable part frame 5-21 may overlap the third magnetic element 5-33 when viewed along the third axis 5-AX3.

According to some embodiments of the present disclosure, the movable part frame 5-21 may overlap the fourth magnetic element 5-34 when viewed along the third axis 5-AX3.

In this way, the internal space of the optical element driving mechanism 5-100 may be effectively utilized, thereby the effect of miniaturization is achieved.

According to some embodiments of the present disclosure, the movable part frame 5-21 may move relative to the fixed part 5-10 in a first movement range.

According to some embodiments of the present disclosure, when the movable part frame 5-21 is located at any position in the first movement range, the movable part 5-20 may not be in contact with the first magnetic element 5-31 when viewed along the second axis 5-AX2.

According to some embodiments of the present disclosure, when the movable part frame 5-21 is located at any position of the first movement range, the movable part 5-20 may not be in contact with the second magnetic element 5-32 when viewed along the second axis 5-AX2.

According to some embodiments of the present disclosure, when the movable part frame 5-21 is located at any position of the first movement range, the movable part 5-20 may not be in contact with the third magnetic element 5-33 when viewed along the second axis 5-AX2.

According to some embodiments of the present disclosure, when the movable part frame 5-21 is located at any position of the first movement range, the movable part 5-20 may not be in contact with the fourth magnetic element 5-34 when viewed along the second axis 5-AX2.

In this way, the movable range of the movable part 5-20 may be increased, and the internal space of the optical element driving mechanism 5-100 may be effectively utilized.

Please refer to FIG. 4, FIG. 5 and FIG. 6, according to some embodiments of the present disclosure, the driving assembly 5-30 may be electrically connected to the circuit assembly 5-60 through the first electrical connection element 5-38.

According to some embodiments of the present disclosure, the driving assembly 5-30 may be electrically connected to the circuit assembly 5-60 through the second electrical connection element 5-39.

For example, the first coil assembly 5-35 and the second coil assembly 5-36 of the driving assembly 5-30 may be electrically connected to the circuit assembly 5-60 through the first electrical connection element 5-38.

For example, the first coil assembly 5-35 and the second coil assembly 5-36 of the driving assembly 5-30 may be electrically connected to the circuit assembly 5-60 via the second electrical connection element 5-39.

According to some embodiments of the present disclosure, the circuit assembly 5-60 may be used for electrical connection with external circuits.

According to some embodiments of the present disclosure, the circuit assembly 5-60 may be circuit boards. According to some embodiments of the present disclosure, the circuit assembly 5-60 may be fixedly disposed on the base 5-12 of the fixed part 5-10.

According to some embodiments of the present disclosure, the circuit assembly 5-60 may be a circuit embedded in the outer frame 5-11 or the base 5-12 of the fixed part 5-10.

According to some embodiments of the present disclosure, the first electrical connection element 5-38 may be flexible. According to some embodiments of the present disclosure, the first electrical connection element 5-38 may be wires or springs.

According to some embodiments of the present disclosure, the first buffering element 5-71 may be disposed at the junction of the first electrical connection element 5-38 and the fixed part 5-10.

According to some embodiments of the present disclosure, the first buffering element 5-71 may be disposed at the junction of the second electrical connection element 5-39 and the fixed part 5-10.

According to some embodiments of the present disclosure, the first buffering element 5-71 may be made of a resin material. According to some embodiments of the present disclosure, the first buffering element 5-71 may be a gel.

According to some embodiments of the present disclosure, the first buffering element 5-71 may be flexible. According to some embodiments of the present disclosure, the first buffering element 5-71 may be in direct contact with the first electrical connection element 5-38.

According to some embodiments of the present disclosure, the first buffering element 5-71 may be in direct contact with the circuit assembly 5-60.

According to some embodiments of the present disclosure, the first buffering element 5-71 may be in direct contact with the outer frame 5-11 or the base 5-12 of the fixed part 5-10.

According to some embodiments of the present disclosure, the second buffering element 5-72 may be disposed at the junction of the first electrical connection element 5-38 and the movable part 5-20.

According to some embodiments of the present disclosure, the second buffering element 5-72 may be disposed at the junction of the second electrical connection element 5-39 and the movable part 5-20.

According to some embodiments of the present disclosure, the second buffering element 5-72 may be made of a resin material. According to some embodiments of the present disclosure, the second buffering element 5-72 may be a gel.

According to some embodiments of the present disclosure, the second buffering element 5-72 may be flexible. According to some embodiments of the present disclosure, the second buffering element 5-72 may be in direct contact with the first electrical connection element 5-38.

According to some embodiments of the present disclosure, the second buffering element 5-72 may be in direct contact with the first coil assembly 5-35. According to some embodiments of the present disclosure, the second buffering element 5-72 may be in direct contact with the second coil assembly 5-36. According to some embodiments of the present disclosure, the second buffering element 5-72 may be in direct contact with the movable part 5-20.

According to some embodiments of the present disclosure, the second buffering element 5-72 may be in direct contact with the driving assembly substrate 5-37. According to some embodiments of the present disclosure, the second buffering element 5-72 may be in direct contact with the movable part frame 5-21.

According to some embodiments of the present disclosure, the first electrical connection element 5-38 and the second electrical connection element 5-39 may be located at opposite sides of the optical element 5-OE when viewed along the second axis 5-AX2.

According to some embodiments of the present disclosure, the first electrical connection element 5-38 and the second electrical connection element 5-39 may be symmetrically when viewed along the second axis 5-AX2.

According to some embodiments of the present disclosure, the first electrical connection element 5-38 and the second electrical connection element 5-39 may be mirror-symmetrical when viewed along the second axis 5-AX2.

According to some embodiments of the present disclosure, the first electrical connection element 5-38 and the second electrical connection element 5-39 may be point-symmetrical when viewed along the second axis 5-AX2.

According to some embodiments of the present disclosure, the first electrical connection element 5-38 may be located at a corner of the optical element driving mechanism 5-100 with a polygonal structure when viewed along the second axis 5-AX2.

According to some embodiments of the present disclosure, the second electrical connection element 5-39 may be located at a corner of the optical element driving mechanism 5-100 with a polygonal structure when viewed along the second axis 5-AX2.

In general, the driving assembly of the optical element driving mechanism of the embodiment of the present disclosure may effectively drive the optical element to move along the first rotation axis, thereby making the operation of the optical element driving mechanism smoother. Moreover, the optical element driving mechanism of the embodiment of the present disclosure may avoid the magnetic interference of the driving assembly, thereby facilitating the driving of the optical element. In addition, the internal space of the optical element driving mechanism may be effectively used, thereby the effect of miniaturization is achieved. Furthermore, the optical element driving mechanism of the embodiment of the present disclosure may effectively prevent the first coil assembly and the second coil assembly from being short-circuited with each other, thereby improving the reliability of the optical element driving mechanism.

In addition, the optical element driving mechanism of the embodiment of the present disclosure may effectively avoid the interaction of the driving forces, thereby making the operation of the optical element driving mechanism smoother. Furthermore, the optical element driving mechanism of the embodiment of the present disclosure may facilitate the assembly of the optical element driving mechanism, thereby reducing the manufacturing cost of the optical element driving mechanism. In addition, the optical element driving mechanism of the embodiment of the present disclosure may make the driving assembly more stable, thereby improving the reliability of the optical element driving mechanism.

Although embodiments of the present disclosure and their advantages have been described in detail, it should be understood that various changes, substitutions and alterations may be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, the scope of the present disclosure is defined by the scope of the appended claims. In addition, each scope of the claims is constructed as a separate embodiment, and various combinations of the claims and combinations of embodiments are within the scope of the present disclosure.

What is claimed is:

1. An optical element driving mechanism, comprising:
a movable part, for connecting an optical element;
a fixed part, wherein the movable part is movable relative to the fixed part;
a driving assembly, for driving the movable part to move relative to the fixed part; and
a first supporting assembly, wherein the movable part is movable relative to the fixed part through the support of the first supporting assembly,
wherein the movable part comprises a movable part setting surface, and the movable part setting surface corresponds to the optical element;
wherein the driving assembly comprises:
a first coil assembly;
a second coil assembly; and
a driving assembly substrate, wherein when viewed along a direction that is perpendicular to a thickness of the driving assembly substrate, the first coil assembly and the second coil assembly are located at opposite sides of the driving assembly substrate,
wherein the driving assembly substrate comprises:
a driving assembly substrate body, having a metal material;
a first insulating layer, located between the driving assembly substrate body and the first coil assembly; and
a second insulating layer, located between the driving assembly substrate body and the second coil assembly,
wherein when viewed along a thickness direction of the driving assembly substrate, the optical element does not overlap the first insulating layer,
wherein when viewed along the thickness direction of the driving assembly substrate, the optical element at least partially overlaps the second insulating layer.

2. The optical element driving mechanism as claimed in claim 1,
wherein the movable part setting surface is parallel to a first axis,
wherein the movable part setting surface is perpendicular to a second axis,
wherein the movable part setting surface is parallel to a third axis,
wherein the first axis is perpendicular to the second axis,
wherein the first axis is perpendicular to the third axis,
wherein the second axis is perpendicular to the third axis,
wherein the optical element driving mechanism with an elongated structure extends along the first axis when viewed along the second axis.

3. The optical element driving mechanism as claimed in claim 2,
wherein the driving assembly is used for driving the optical element to move in a first dimension,
wherein the driving assembly is used for driving the optical element to move in a second dimension,
wherein the first dimension is different from the second dimension,
wherein the first dimension is a rotation about a first rotation axis,
wherein the first rotation axis is parallel to the first axis,
wherein the second dimension is a rotation about a second rotation axis,
wherein the second rotation axis is parallel to the third axis.

4. The optical element driving mechanism as claimed in claim 3,
wherein the driving assembly comprises:
a first magnetic element;
a second magnetic element, corresponding to the first coil assembly;
a third magnetic element;
a fourth magnetic element, corresponding to the second coil assembly,
wherein the first magnetic element is used to correspond to a movable part frame of the movable part to generate a first driving force,
wherein the first driving force is used to move the movable part frame relative to the fixed part in the first dimension,
wherein the second magnetic element is used to generate a second driving force to the movable part frame,
wherein the second driving force is used to move the movable part frame relative to the fixed part in the first dimension,
wherein the direction of the first driving force is parallel to the direction of the second driving force,
wherein the magnetic pole alignment direction of the first magnetic element is the same as the magnetic pole alignment direction of the second magnetic element;
wherein the first coil assembly corresponds to the first magnetic element;
wherein the second coil assembly corresponds to the third magnetic element.

5. The optical element driving mechanism as claimed in claim 4,
wherein the first magnetic element and the second magnetic element are located at opposite sides of the optical element when viewed along the second axis,
wherein the first magnetic element and the second magnetic element are located at opposite sides of the first rotation axis when viewed along the second axis,
wherein when viewed along the second axis, the line that connects the center of the first magnetic element and the center of the second magnetic element passes through the optical element,
wherein a third driving force is on the movable part setting surface of the movable part,
wherein the third driving force is used to move the movable part setting surface relative to the movable part frame in the second dimension,
wherein the fourth magnetic element is used to generate a fourth driving force to the movable part setting surface,
wherein the fourth driving force is used to move the movable part setting surface relative to the movable part frame in the second dimension.

6. The optical element driving mechanism as claimed in claim 5,
wherein the direction of the third driving force is parallel to the direction of the fourth driving force, wherein the magnetic pole alignment direction of the third magnetic element is the same as the magnetic pole alignment direction of the fourth magnetic element, wherein the third magnetic element and the fourth magnetic element are located at opposite sides of the optical element when viewed along the second axis, wherein the third magnetic element and the fourth magnetic element are located at opposite sides of the second rotation axis when viewed along the second axis, wherein when viewed along the second axis, the line that connects the center of the third magnetic element and the center of the fourth magnetic element passes through the optical element.

7. The optical element driving mechanism as claimed in claim 6, wherein the direction of the first driving force is parallel to the direction of the third driving force, wherein the magnetic pole alignment direction of the first magnetic element is not parallel to the magnetic pole alignment direction of the third magnetic element, wherein the magnetic pole alignment direction of the first magnetic element is perpendicular to the magnetic pole alignment direction of the third magnetic element, wherein the alignment direction of the center of the first magnetic element and the center of the second magnetic element is not parallel to the alignment direction of the center of the third magnetic element and the center of the fourth magnetic element, wherein the alignment direction of the center of the first magnetic element and the center of the second magnetic element is perpendicular to the alignment direction of the center of the third magnetic element and the center of the fourth magnetic element.

8. The optical element driving mechanism as claimed in claim 7, wherein when viewed along the second axis, the shortest distance between the first magnetic element and the center of the movable part setting surface is different from the shortest distance between the third magnetic element and the center of the movable part setting surface, wherein when viewed along the second axis, the shortest distance between the first magnetic element and the center of the movable part setting surface is greater than the shortest distance between the third magnetic element and the center of the movable part setting surface, wherein when viewed along the second axis, the shortest distance between the first magnetic element and the second magnetic element is different from the shortest distance between the third magnetic element and the fourth magnetic element, wherein when viewed along the second axis, the shortest distance between the first magnetic element and the second magnetic element is greater than the shortest distance between the third magnetic element and the fourth magnetic element.

9. The optical element driving mechanism as claimed in claim 8, wherein when viewed along the magnetic pole alignment direction of the first magnetic element, the first magnetic element partially overlaps the third magnetic element, wherein when viewed along the magnetic pole alignment direction of the third magnetic element, the third magnetic element does not overlap the first magnetic element, wherein the first magnetic element has an elongated structure, and the third magnetic element has an elongated structure when viewed along the second axis, wherein the length of the first magnetic element is greater than the length of the third magnetic element when viewed along the second axis, wherein the width of the first magnetic element is shorter than the width of the third magnetic element when viewed along the second axis.

10. The optical element driving mechanism as claimed in claim 9, further comprising:

a second supporting assembly, wherein the movable part setting surface is movable relative to the movable part frame through the second supporting assembly, wherein the first supporting assembly comprises a first supporting element with an elongated structure, wherein the first supporting element is movable relative to the fixed part or the movable part frame, wherein the second supporting assembly is flexible, and the second supporting assembly is partially fixedly connected to the movable part setting surface and the movable part frame.

11. The optical element driving mechanism as claimed in claim 10, wherein the first magnetic element does not overlap the first supporting element when viewed along the first axis, wherein the third magnetic element at least partially overlaps the first supporting element when viewed along the first axis, wherein the first magnetic element at least partially overlaps the first supporting element when viewed along the third axis, wherein the third magnetic element does not overlap the first supporting element when viewed along the third axis.

12. The optical element driving mechanism as claimed in claim 11, wherein the first coil assembly is disposed on the driving assembly substrate, wherein the driving assembly substrate has a plate-like structure, wherein the first coil assembly is disposed on a first driving assembly substrate surface of the driving assembly substrate, wherein the second coil assembly is disposed on the driving assembly substrate, wherein the second coil assembly is disposed on a second driving assembly substrate surface of the driving assembly substrate, wherein the first driving assembly substrate surface and the second driving assembly substrate surface face in different directions.

13. The optical element driving mechanism as claimed in claim 12, wherein the first driving assembly substrate surface and the surface of the second driving assembly substrate surface face opposite directions, wherein when viewed along the first coil assembly winding axis of the first coil assembly, the first coil assembly and the second coil assembly do not overlap each other, wherein when viewed along the second coil assembly winding axis of the second coil assembly, the second coil assembly at least partially overlaps the optical element.

14. The optical element driving mechanism as claimed in claim 13, wherein the driving assembly substrate is disposed on the movable part frame.

15. The optical element driving mechanism as claimed in claim 14,
wherein the second driving assembly substrate surface faces the movable part frame,
wherein when viewed along a direction that is perpendicular to the thickness of the driving assembly substrate, the second coil assembly partially overlaps the movable part frame,
wherein the second supporting assembly and the driving assembly substrate have an integrated structure.

16. The optical element driving mechanism as claimed in claim 15,
wherein the first magnetic element is fixedly disposed on the fixed part,
wherein the third magnetic element is fixedly disposed on the fixed part,
wherein the movable part frame forms a first space with a hollow structure and is used for accommodating a part of the driving assembly,
wherein the third magnetic element is located in the first space when viewed along the second axis.

17. The optical element driving mechanism as claimed in claim 16,
wherein the first magnetic element is not located in the first space when viewed along the second axis,
wherein the movable part frame does not overlap the first magnetic element when viewed along the second axis,
wherein the movable part frame does not overlap the third magnetic element when viewed along the second axis,
wherein the movable part frame is movable relative to the fixed part in a first movement range,
wherein when the movable part frame is located at any position within the first movement range, the movable part is not in contact with the first magnetic element when viewed along the second axis,
wherein when the movable part frame is located at any position within the first movement range, the movable part is not in contact with the third magnetic element when viewed along the second axis.

18. The optical element driving mechanism as claimed in claim 17, further comprising a circuit assembly,
wherein the driving assembly further comprises:
a first electrical connection element, wherein the driving assembly is electrically connected to the circuit assembly through the first electrical connection element; and
a second electrical connection element, wherein the driving assembly is electrically connected to the circuit assembly through the second electrical connection element,
wherein the circuit assembly is fixedly disposed on the fixed part,
wherein the circuit assembly is used for electrical connection with an external circuit,
wherein the first electrical connection element is flexible.

19. The optical element driving mechanism as claimed in claim 18,
wherein a first buffering element is disposed at the junction of the first electrical connection element and the fixed part,
wherein the first buffering element is made of a resin material,
wherein the first buffering element is flexible,
wherein the first buffering element is in direct contact with the first electrical connection element,
wherein the first buffering element is in direct contact with the circuit assembly,
wherein the first buffering element is in direct contact with the fixed part.

20. The optical element driving mechanism as claimed in claim 19,
wherein a second buffering element is disposed at the junction of the first electrical connection element and the movable part,
wherein the second buffering element is made of a resin material,
wherein the second buffering element is flexible,
wherein the second buffering element is in direct contact with the first electrical connection element,
wherein the second buffering element is in direct contact with the first coil assembly,
wherein the second buffering element is in direct contact with the movable part,
wherein the second buffering element is in direct contact with the driving assembly substrate,
wherein the second buffering element is in direct contact with the movable part frame,
wherein the first electrical connection element and the second electrical connection element are located at opposite sides of the optical element when viewed along the second axis,
wherein the first electrical connection element is located at the corner of the optical element driving mechanism with a polygonal structure when viewed along the second axis.

* * * * *